United States Patent
Maver

(10) Patent No.: US 6,177,493 B1
(45) Date of Patent: Jan. 23, 2001

(54) CHALK ADHESION IN EXTERIOR FLAT PAINTS

(75) Inventor: Tammy Lynne Maver, Moorestown, NJ (US)

(73) Assignee: Rohm and Haas Company, Philadelphia, PA (US)

( * ) Notice: Under 35 U.S.C. 154(b), the term of this patent shall be extended for 0 days.

(21) Appl. No.: 08/395,248

(22) Filed: Feb. 27, 1995

Related U.S. Application Data

(62) Division of application No. 08/167,385, filed on Dec. 15, 1993.

(51) Int. Cl.⁷ ...................................................... C08L 83/00
(52) U.S. Cl. .......................... 524/188; 524/458; 524/501; 524/502; 524/515; 524/832; 524/833
(58) Field of Search ..................................... 524/188, 458, 524/501, 502, 515, 832, 933

(56) References Cited

U.S. PATENT DOCUMENTS

| 3,454,516 | 7/1969 | Victorius | 524/522 |
|---|---|---|---|
| 4,199,400 | 4/1980 | Bakule | 162/146 |
| 4,340,524 | 7/1982 | Bullman | 524/297 |
| 4,504,609 | 3/1985 | Kuwajima et al. | 523/501 |
| 4,529,765 | 7/1985 | DenHartog | 524/294 |
| 5,202,378 * | 4/1993 | Barnett | 524/833 |
| 5,278,225 | 1/1994 | Kohlhammer et al. | 524/560 |
| 5,399,612 * | 3/1995 | Calhoun | 524/506 |

FOREIGN PATENT DOCUMENTS

| 3064305 * | 3/1991 | (JP) . |
|---|---|---|
| 9214788 | 9/1992 | (WO) . |

* cited by examiner

*Primary Examiner*—Terrel Morris
*Assistant Examiner*—John J. Guarriello

(57) ABSTRACT

The present invention relates to a blend composition and a method for the use of such to improve the adhesion properties of coatings.

More particularly, the present invention relates to the use of a polymeric blend containing a macromolecular aqueous dispersion, an acid-functional alkali-soluble resin, and an aminosilane in order to provide adhesion of coatings over difficult surfaces such as chalky substrates.

6 Claims, No Drawings

CHALK ADHESION IN EXTERIOR FLAT PAINTS

This is a divisional of application Ser. No. 08/167,385, filed Dec. 15, 1993.

FIELD OF THE INVENTION

The present invention relates to a blend composition and a method for the use of such to improve the adhesion properties of coatings.

More particularly, the present invention relates to the use of a polymeric blend containing a macromolecular aqueous dispersion, an acid-functional alkali-soluble resin, and an aminosilane in order to provide adhesion of coatings over difficult surfaces such as chalky substrates.

BACKGROUND OF THE INVENTION

Water-based latex paints have found wide use and acceptance in exterior applications. Water-based latex paints have proven their exterior durability and toughness and, because they are water-based, health, safety and environmental concerns are significantly minimized relative to solvent-based alkyd paints. However, water-based latex paints have inferior adhesion over difficult surfaces such as "chalky substrates" when compared to solvent-based alkyd paints.

Chalky substrates result when the latex paint degrades from exposure to rain and sunlight. The degradation process causes pigments and extenders, such as titanium dioxide and aluminum silicates, to become unbound and to appear on the painted surface as a dusty white chalk. Because of their ability to wet, to penetrate and to adhere to chalky substrates, solvent-based alkyd paints continue to out-perform water-based latex paints over these substrates.

What has been found to be novel and unanticipated is a composition and a method of using such where a polymeric blend containing a macromolecular aqueous dispersion and an acid-functional alkali-soluble resin, and an aminosilane provides adhesion of the latex paint to chalky substrates.

Some of the major advantages of the present invention are that: it minimizes safety, health and environmental concerns by being water-based; it allows for the substitution of a water-based latex paint in a market that was previously dominated by solvent-based alkyd paints; and, the use of the water-based latex system of the present invention over chalky substrates is possible without compromising physical properties such as adhesion.

PRIOR RELATED ART

Although it is generally known to modify the properties of polymers by incorporating functional groups, none of the related art discloses the use of polymeric blends containing a macromolecular aqueous dispersion, an acid-functional alkali-soluble resin, and an aminosilane to provide improved adhesion of latex paints to chalky substrates.

Japanese Patent Application No. J 03-064305A discloses an aqueous silane-modified macromolecular dispersion composition for improving the wet adhesion of adhesives and paints to glass that consists of a carboxyl group-containing water-soluble resin, a macromolecular aqueous dispersion and a water-soluble silane coupling agent containing an amino group. The carboxyl group-containing water-soluble resin has an acid number of 30–800 and the amount compounded are per 100 solid parts by weight of the macromolecular aqueous dispersion, 0.2 to 2.0 parts by weight of the water-soluble resin and 0.1 to 3.0 parts by weight of the amino group-containing silane coupling agent.

U.S. Pat. No. 4,340,524 discloses an acrylic resin latex-based sealant composition with improved water resistance and wet adhesion to glass and aluminum which comprises introducing about 0.1 to about 10 weight percent of an hydrophobic resin dissolved in about 2 to about 20 weight percent of a liquid organic, non-coagulating, non-gelling solvent into the acrylic resin latex together with an aqueous solution of about 0.5 to about 5.0 weight percent of a hydrolyzed organoaminosilane containing sufficient base to maintain a pH of at least 8.5.

International Publication No. WO 92/14788 discloses a composition that provides quasi-crosslinked, alkali-soluble polymeric surface coatings that includes an acid-functional vinyl polymer and an amino-functional siloxane, wherein the vinyl polymer has at least two acid-functional pendant moieties and wherein the siloxane polymer has at least two amino-functional pendant moieties.

U.S. Pat. No. 5,202,378 discloses a polymeric binder exhibiting excellent chalk adhesion wherein the protective coating composition contains a film-forming polymeric binder comprising emulsion copolymerized ethylenically unsaturated monomers including minor amounts of a fatty acid methacrylate or acrylate.

Another way well known in the art to obtain chalk adhesion of latex paints is to blend a solvent-based alkyd into a latex paint. Although this type of blend improves chalk adhesion of the latex paint, the solvent-based alkyd causes undesirable oxidative degradation of the paint film. Various patents including U.S. Pat. No. 4,504,609, U.S. Pat. No. 4,529,765, U.S. Pat. No. 4,199,400 and U.S. Pat. No. 3,454,516, demonstrate the blending of a solvent-based alkyd with a latex for improved chalk adhesion properties.

SUMMARY OF THE INVENTION

One aspect of the invention provides a composition containing a blend of a macromolecular aqueous dispersion latex, an acid-functional alkali-soluble resin, and an aminosilane.

In another aspect of the invention is provided a method for improving the adhesion of latex paint to chalky substrates by combining a macromolecular aqueous dispersion, an acid-functional alkali-soluble polymer, an aminosilane and applying a coating containing the blend of the macromolecular aqueous dispersion, the acid-functional alkali-soluble polymer, and the aminosilane to a chalky substrate.

DETAILED DESCRIPTION

What has been found to be novel and unanticipated is that a composition of a polymeric blend containing a macromolecular aqueous dispersion, an acid-functional alkali-soluble resin, and an aminosilane when used as a binder for a coating provides adhesion to chalky substrates.

In another aspect of the invention is provided a method for improving the adhesion of latex paint to chalky substrates by combining a macromolecular aqueous dispersion, an acid-functional alkali-soluble resin, and an aminosilane and applying the blend of the macromolecular aqueous dispersion, the acid-functional alkali-soluble resin, and the aminosilane, which has been formulated into a coating, to a chalky substrate.

Macromolecular Aqueous Dispersion

The macromolecular aqueous dispersion, also known as a latex or emulsion polymer used in this invention can be any one of many used in architectural coatings-type applications. Suitable monomers for the preparation of polymers to be used in the macromolecular aqueous dispersion according to the invention are olefinically unsaturated compounds which are also employed for the preparation of conventional paint dispersions, such as: esters of acrylic acid or methacrylic acid with alcohols from 1 to 8 carbons, such as, but not limited to, ethyl acrylate, n-butyl acrylate, isobutyl acrylate, 2-ethylhexyl acrylate, methyl methacrylate, butyl methacrylate; vinyl esters such as, but not limited to, vinyl acetate, vinyl propionate, vinyl isobutyrate, vinyl esters of 2-ethyl hexanoic acid, vinyl esters of branched C-9 or C-10 carboxylic acids; monovinyl aromatic compounds such as, but not limited to, styrene and vinyl toluene; vinyl chloride, vinylidene chloride, acrylonitrile and ethylene. Minor amounts of unsaturated monocarboxylic acid, their amides or nitriles such as acrylic acid, methacrylic acid, itaconic acid, maleic acid, fumaric acid, acrylamide and methacrylamide can be included. Also included may be a variety of functional monomers in minor amounts including hydroxyethyl acrylate, hydroxyethyl methacrylate, hydroxypropyl acrylate, hydroxypropyl methacrylate, sodium vinyl sulfonate, sodium styrene sulfonate, sulfoethyl methacrylate and acetoacetoxyethyl methacrylate and many others including adhesion promoting monomers, such as disclosed and prepared in accordance with U.S. Pat. Nos. 2,980,652; 4,599,417 and 4,777,265, and by this reference is incorporated herein.

Preferred monomers are those which produce stable dispersions. The quantitative ratios must be selected according to practices well known in the art in such a way that polymers are made having minimum film formation temperatures below or within the range of the intended application temperatures and having desired degree of flexibility and rigidity.

Particle size of these macromolecular aqueous dispersions can be in the range from 0.05 to 1.0 micron. Also included are various particle size distributions prepared by either blending or in-situ polymerization. Macromolecular aqueous dispersions can be prepared by polymerization of polymer particles of different sizes, where several distinct maxima in the particle size distribution creates a polymodal dispersion and where two such distinct maxima in the particle size distribution curve creates bimodal dispersions. The preparation of bimodal dispersion is further described in U.S. Pat. No. 4,384,056 and by this reference is incorporated herein. Also, non-spherical particles such as multilobal particles can be prepared as disclosed in U.S. Pat. No. 4,791,151 and by this reference is incorporated herein.

Polymerizations are carried out using typical ionic and/or nonionic emulsifiers, initiators, and polymerizations conditions (+10° C. to +100° C.).

Depending on the type of monomers used, at the end of the polymerization, the dispersions are adjusted to a pH ranging from about 5 to about 10, preferably from about 7 to about 9, by means of alkali, ammonia or amines.

Alkali-Soluble Resins

The acid-functional alkali-soluble resin to be neutralized with the aminosilane in accordance with the present invention can be prepared via any processes known in the art. The low molecular weight acid-functional alkali-soluble resin with a weight average molecular weight of less than about 100,000 can be prepared via any emulsion or solution polymerization process that can be used to produce as such an acid-functional alkali-soluble resin which is water dispersible. Suitable monomers for the preparation of alkali-soluble resins according to the invention are olefinically unsaturated compounds such as: esters of acrylic acid or methacrylic acid with alcohols from 1 to 8 carbons, such as, but not limited to, ethyl acrylate, n-butyl acrylate, isobutyl acrylate, 2-ethyl hexyl acrylate, methyl methacrylate, butyl methacrylate; vinyl esters such as, but not limited to, vinyl acetate, vinyl propionate, vinyl isobutyrate, vinyl esters of 2-ethyl hexanoic acid vinyl esters of branched C-9 or C-10 carboxylic acids; monovinyl aromatic compounds such as, but not limited to, styrene and vinyl toluene; vinyl chloride, vinylidene chloride, and ethylene. Preferably, the alkali-soluble resin may contain from about 0 weight percent to about 90 weight percent of ethyl acrylate, butyl acrylate, methyl methacrylate and/or styrene based on total weight of the polymer.

Acid functionality is usually, but not in all instances, limited to the use of acid-functional monomers, such as, for example, acrylic acid, methacrylic acid fumaric acid, maleic acid, crotonic acid, itaconic acid, sodium styrene sulfonate, sulfoethyl methacrylate, acrylamidopropansulphonic acid, and vinylsulphonic acid. Preferably, acrylic acid and/or methacrylic acid and/or itaconic acid are used as monomer units containing acid groups in the practice of this invention at levels from about 50 weight percent to about 5 weight percent. The acid level of the alkali-soluble resin should be at the indicated levels to insure solubility upon addition of the aminosilane. If the acid level is below the levels indicated, adhesion over chalky substrates is compromised. Preferably, the alkali-soluble resin contains from about 70 to about 90 weight percent ethyl acrylate and from about 10 to about 30 weight percent methacrylic acid based on total weight of the polymer.

To obtain appropriate molecular weight alkali-soluble resins with a weight average molecular weight of less than about 100,000 and to insure their solubility, chain transfer agents are added to the polymerization in levels from 0.5 weight percent to 10 weight percent based on the total weight of monomers. Such chain transfer agents may be are selected from, but are not limited to, the group consisting of n-dodecyl mercaptan, t-dodecyl mercaptan, methyl mercaptopropionate, butyl mercaptopropionate and 3-mercaptopropionic acid, as well as others known to those skilled in the art. Alternate routes to low molecular weight alkali-soluble resins with a weight average molecular weight of less than about 100,000, including high temperature solution polymerizations, are also appropriate.

Also included may be a variety of functional monomers in minor amounts including hydroxyethyl acrylate, hydroxyethyl methacrylate, hydroxypropyl acrylate, hydroxypropyl methacrylate, sodium vinyl sulfonate, sodium styrene sulfonate, sulfoethyl methacrylate, acetoacetoxyethyl methacrylate, and many others including adhesion promoting monomers, such as disclosed and prepared in accordance with U.S. Pat. Nos. 2,980,652; 4,599,417 and 4,777,265, and by this reference is incorporated herein.

Polymerizations are carried out using typical ionic and/or nonionic emulsifiers, initiators, and polymerizations conditions (+10° C. to +100° C.) known to those skilled in the art.

In this invention, the acid-functional alkali-soluble resin is blended with the macromolecular aqueous dispersion in levels from about 1 weight percent to about 50 weight percent based on total polymer weight. More preferably, the alkali-soluble resin is blended with the macromolecular aqueous dispersion in levels from about 5 weight percent to about 20 weight percent. In addition, the alkali-soluble resin can be prepared in-situ with the macromolecular aqueous dispersion at similar ratios by a sequential polymerization process as disclosed and prepared in accordance with U.S. Pat. Nos. 4,016,171 and 4,876,313, and by this reference is incorporated herein.

Aminosilane

The aminosilane-modified latex of the present invention is prepared by adding an effective amount of an aminosilane to a blend of an acid-functional alkali-soluble resin and a macromolecular aqueous dispersion. The quantity of aminosilane that is added to the polymer is a function of the acid content of the alkali-soluble resin. A sufficient amount of aminosilane is added to neutralize from about 50 percent to about 100 percent of the acid content of the alkali-soluble resin. If an excess of an aminosilane, i.e. greater than or equal to 100 weight percent of that which is needed to neutralized the acid component of the alkali-soluble resin, adhesion to chalky substrates is not compromised.

In general, aminosilanes are organic materials containing silicone and amine functionality. Aminosilanes found to effectively neutralize alkali-soluble resins to achieve adhesion to chalky substrates may be selected from, but are not limited to, the group consisting of trimethoxysilylpropyldiethylenetriamine (Huls T2910 or A1130 from Union Carbide), N-methylaminopropyltrimethoxysilane, N-(2-aminoethyl)-3-aminopropylmethyldimethoxysilane (Huls A0699), N-(2-aminoethyl)-3-aminopropyltrimethoxysilane (Dow Corning Z-6020, Huls A0700 or A1120 from Union Carbide), aminopropylmethyldimethoxysilane, 3-aminopropyltrimethoxysilane (Huls A0800 or A1110 from Union Carbide), polymeric aminoalkylsilicone 3-aminopropylmethyldiethoxysilane (Huls A0742), 3-aminopropyltriethoxysilane (Huls A0750 or A1100 from Union Carbide) and the like, are available from Dow Corning, Midland, Mich., Union Carbide Specialty Chemicals Division, Danbury Conn. and Huls of America, Piscataway, N.J.

It is believed that the combination of the aminosilane with an acid-functional alkali-soluble resin aids in the minimization of the water sensitivity of the paint film as well as providing a coupling mechanism for the coating to the chalk. However, this is merely a theory of the present invention and should not be considered in any way whatsoever to limit the scope of such, which is more specifically defined in the claims.

Additives

The blend of this invention of the macromolecular aqueous dispersion and alkali-soluble resin neutralized with aminosilane, may be formulated into paints or coatings according to the desired end-use. Additives such as thickeners, dispersants, pigments, extenders, fillers, antifreeze agents, plasticizers, coalescents, wetting agents, defoamers, colorants, biocides, soaps and slip agents may be incorporated as per procedures known to those skilled in the art.

TEST METHODS

Adhesion to chalky substrates is measured in a number of different ways, including Crosshatch Adhesion, Knife Peel Adhesion, as well as Force-to-Peel Adhesion. The substrate is a typical commercial alkyd paint which has been naturally weathered to achieve an ASTM chalk rating of 5. Boards were painted with a commercially acceptable alkyd paint and then exposed to rain and sunlight, causing the polymer to degrade and the formation of unbound pigment and extenders referred to as "chalk". Adhesion is tested over this type of substrate.

Both crosshatch and knife peel adhesion involve the application of the paints via a brush onto the chalked substrates. Two coats of the test paints are applied on the test area using a spread rate of 450 sq. ft./gallon. The test panels are allowed to dry for 4 to 5 hours in between coats. The test panels are then allowed to dry for 7 days under controlled conditions (70° F., 50% RH). Following a 7 day dry, the test panels are placed in a fog box (simulating rain conditions) for one hour prior to actual crosshatch and knife peel adhesion testing.

In the crosshatch adhesion testing, a Gardner Adhesion Knife with a 100 square grid is used to scribe the test area. The area is then patted dry and a piece of tape with a 1.5" overhang to form a pull tab (typically Permacel 1" tape) is applied over the test area. The tape is rubbed with an eraser to assure good contact over the test area, and then using the overlap for grip, the tape is pulled quickly at a 180° angle from the substrate. The test area is then rated for paint remaining by counting the squares of paint left behind. A rating of 100 is excellent adhesion as none of the test paint was removed by the tape; therefore, implying excellent adhesion between the test paint and the chalked substrate. A rating of 0 is poor adhesion. Through much experience, we believe that obtaining a crosshatch adhesion of at least 50 is significant adhesion.

Knife peel adhesion requires using an Excel Adhesion Knife (or comparable one) to make two knife cuts forming a X intersecting at about a 30° angle. The point of the Excel Adhesion Knife is then used to attempt to peel the latex paint from the substrate, at the point of intersection. The degree of peeling difficulty is rated subjectively according to the following scale:

10=no peeling
9=very difficult
8=difficult
7=moderately difficult
6=slightly to mod. difficult
5=slightly difficult
4=fairly easy
3=easy
2=very easy
1=falls off A knife peel rating of 6 or above is considered significant adhesion.

Force-to-peel adhesion involves the same chalked substrates, the same drying conditions and the same exposure time in the fog box. Test panel preparation involves applying 2.5 grams of test paint to a 2"×6" area of the substrate; immediately placing a 1.5"×9" strip of cheesecloth on the wet paint, leaving a 1.5" overhang over the edge; firmly pressing the cheesecloth into the wet paints, and then saturating the cheesecloth by applying an additional 5.5 grams of test paint. After drying for 7 days at controlled conditions (70° F., 50% RH), a 1" wide strip is cut through the length of the cheesecloth using a utility knife and a template. The test panel is then placed in a fog box for one hour. After removing the panel from the fog box, it is attached horizontally to a ring stand slanting forward at approximately 10° from the perpendicular using utility/burette clamps. The thin edge of the test panel must be in the up direction. A weight hanger is attached to the cheesecloth via an S hook or paperclip. Weight is then increased on the hanger in 10, 20 and 50 gram increments until the cheesecloth peels away from the substrate at a rate of 10–20 mm/minute. The panel may be marked with a scale or rule to use as a guide for determining the rate of separation. The untested areas must be kept wet during the testing by draping them with a water-saturated piece of cheesecloth.

The amount of weight in grams required to achieve the separation, up to 1500 grams, is reported as well as the mode of failure:

Cohesive: Failure of paint itself, rather than bond between the test paint and the substrate Adhesive: Separation of the test paint from the substrate Substrate: Total paint failure into the wood surface Typically the achievement of from about 800 grams and higher in this test is considered significant adhesion. In addition, any cohesive failure (as opposed to 100% adhesive failure) is indicative of true improvements in adhesion.

GLOSSARY

AA=acrylic acid
ASR=alkali soluble resin
BA=butyl acrylate
EA=ethyl acrylate
MAA=methacrylic acid
MMA=methyl methacrylate
MMP=methyl mercaptopropionate
STY=styrene
SVS=sodium vinylsulfonate
VA=vinyl acetate The following examples are provided to further illustrate some of the embodiments of the present invention. They should not be interpreted as limiting the scope of the invention, which is more specifically defined in the claims.

EXAMPLES

The blends in Table I through Table VI were prepared by adding 80 to 95 weight percent of the macromolecular aqueous dispersion to a container. The pH of this dispersion is measured and designated as the initial pH. Under agitation, supplied by a typical laboratory mixer, the alkali-soluble resin at 20 to 5 weight percent was added. The pH of the system was monitored to ensure that the pH of this mixture does not drop below a value which would jeopardize the stability of the macromolecular aqueous dispersion.

The aminosilane is then added slowly to this mixture so that all of the acid introduced into the mixture from the alkali-soluble resin is indeed neutralized by the aminosilane. If the pH of the mixture of the macromolecular aqueous dispersion and the alkali-soluble resin begins to drop below the critical pH required for dispersion stability, the alkali-soluble resin may be added in increments, following each increment addition by the addition of some aminosilane until all of the alkali-soluble resin was added and the desired initial pH was obtained.

The above-prepared blend was then added to a paint in the traditional way known to all of those skilled in the art of paint formulating. In Tables I through Table VI below, data has been reported where the blends are formulated into 45% PVC (Pigment Volume Concentration) and 36% VS (Volume Solids) paints which contained traditional titanium dioxide and extenders used for exterior flat paints.

Although the present evaluation was limited to exterior flat paints, it is intended that the use of blends of a macromolecular aqueous dispersion, alkali-soluble resin and aminosilane can be used in other formulation types such as, but not limited to, high gloss, semi-gloss, sheen paints as well as primers, to improve their chalk adhesion.

Example 1

Example 1 demonstrates the use of a blend of a macromolecular aqueous dispersion, alkali-soluble resin and an aminosilane. Comparison to a non-modified macromolecular aqueous dispersion shows improvements in chalk adhesion. In this example, the macromolecular aqueous dispersion is designated as Latex A with the composition of 49 BA/49 MMA/2 MAA and was prepared using the following procedure:

A 5 liter glass reactor with an agitator, a thermocouple for monitoring the temperature and a reflux condenser, was charged with 800 g of deionized water and purged with nitrogen. After heating to 88° C., 4.0 g of ammonium persulfate dissolved in 20 g of deionized water and 165 g of a seed latex (45% solids, 100 nm diameter) were added to the reactor. The temperature was adjusted to 85° C., and then a pre-emulsion prepared from 980 g butyl acrylate, 980 g methyl methacrylate, 40 g methacrylic acid, 5.0 g sodium dodecylbenzenesulfonate and 517 g deionized water and an additional 3.0 g of ammonium persulfate dissolved in 90 g deionized water were added to the reactor over a three hour time period while maintaining the temperature at 85° C. When the additions were complete, the temperature was maintained at 85° C. for an additional 30 minutes. The reaction was cooled to 60° C. and 4 g of t-butyl hydroperoxide dissolved in 20 g of deionized water and 3 g of sodium formaldehydesulfoxylate dissolved in 40 g of deionized water were added. The pH was adjusted with 40 g of 14% aqueous ammonia. Then 57.4 g of Triton X-405 surfactant dissolved in a equal weight of deionized water was added. The resulting latex had a solids content of 54.7%, a pH of 8.9, a particle size of 291 nm and a Brookfield viscosity (#2, 60) of 143 cps.

The alkali-soluble resin used in Example 1 is designated as ASR A and has the composition of 80 EA/20 MAA with 1.2% MMP. It was prepared as follows: A 3 liter glass reactor with an agitator, a thermocouple for monitoring the temperature and a reflux condenser, was charged with 625 g deionized water an 11 g of Polystep B-1 and purged with nitrogen. After heating to 85° C., 4.0 g of ammonium persulfate dissolved in 20 g of deionized water was added. A pre-emulsion prepared from 640 g ethyl acrylate, 160 g methacrylic acid, 9.6 g methyl mercaptopropionate, 16 g Polystep B-1 and 350 g deionized water and 1.0 g ammonium persulfate dissolved in 90 g of deionized water were added uniformly over 3 hours while maintaining the temperature at 85° C. When the additions were complete, the reactor was held at 85° C. for an additional 30 minutes. The reactor was then cooled to 60° C. and 1 g t-butyl hydroperoxide dissolved in 5 g of deionized water and 0.7 g of sodium formaldehydesulfoxylate dissolved in 10 g of deionized water were added. The resulting alkali-soluble resin had a solids content of 42.0%, a pH of 2.2, a particle size of 156 and a Brookfield viscosity (#1, 60) of 13 cps and a weight average molecular weight of 17000.

The aminosilane used in this example is A0742 manufactured by Huls. Chemically, A0742 is 3-aminopropylmethyldiethoxy silane. In this example, 10 weight percent of ASR A was added to 90 weight percent of Latex A and then under agitation, the appropriate amount of aminosilane (A0742) was added to neutralize all of the acid in ASR A. In this example, it required 10.8 lbs of A0742 per 100 gallon paint formulation. The blend was added to the paint as the latex following normal paint making protocol known to those skilled in the art. The specific paint formulation used in Example 1 is as follows:

|  | Material Name | Pounds | Gallons |
|---|---|---|---|
|  | Natrosol 250 MHR (2.5%) | 120.0 | 14.40 |
|  | Water | 20.0 | 2.40 |
|  | Propylene Glycol | 60.0 | 6.93 |
|  | Tamol 165 | 20.5 | 2.32 |
|  | Triton CF-10 | 1.0 | 0.11 |
|  | Colloid 643 | 2.0 | 0.26 |
|  | Kathon LX (1.5%) | 1.8 | 0.22 |
|  | Ti-Pure R-902 | 225.0 | 6.75 |
|  | Icecap K | 50.0 | 2.28 |
|  | Minex 4 | 155.6 | 7.17 |
|  | Grind the above on a high speed impeller mill at 3800–4500 FPM for 20 minutes. At a slower speed, let down as follows: | | |
| Blend | Latex A (54.7% solids) | 310.5 | 34.77 |
|  | ASR A (41.9% solids) | 45.0 | 5.03 |
|  | Aminosilane A0742 (100%) | 10.8 | 1.40 |
|  | Texanol | 9.4 | 1.19 |
|  | Colloid 643 | 2.0 | 0.26 |
|  | Natrosol 250 MHR (2.5%) | 50.4 | 6.05 |
|  | Water | 70.5 | 8.46 |
|  | Totals | 1154.5 | 100.00 |

TABLE I

| Latex | ASR | Amine | Crosshatch | Knife Peel | Force-to-Peel |
|---|---|---|---|---|---|
| Substrate = Chalky Alkyd | | | | | |
| Latex A | none | NH₄OH | 5 | 5 | 700 - Ad/Co |
| Latex A | 10% ASR A | A0742 | 100 | 8 | 1450 - Co |

Latex A = Latex with composition equal to 49 BA/49 MMA/2 MAA, particle size = 291 nm.
ASR A = 80 EA/20 MAA with 1.2% MMP as chain transfer agent, particle size = 156 nm.
A0742 is aminosilane: 3-aminopropylmethyldiethoxy silane.

Example 2

Example 2 demonstrates that improvements in chalk adhesion are obtained by blending both the alkali-soluble resin and the aminosilane with a macromolecular aqueous dispersion. Blending of either the alkali-soluble resin or the aminosilane with the macromolecular aqueous dispersion without the other does not provide for significant improvements in chalk adhesion. The macromolecular aqueous dispersion in this example is designated as Latex B. Latex B was prepared according to the procedure for Latex A except that the pre-emulsion contained 980 g of styrene in place of the 980 g of methyl methacrylate. The resulting latex had a solids content of 54.6%, a pH of 8.8, a particle size of 297 nm and a Brookfield viscosity (#2, 60) of 98 cps.

The blend of Latex B with ASR A and aminosilane A0742 was added to the same paint formulation as in Example 1.

TABLE II

| Latex | ASR | Amine | Crosshatch | Knife Peel | Force-to-Peel |
|---|---|---|---|---|---|
| Substrate-Chalky Alkyd | | | | | |
| Latex B | none | NH₄OH | 0 | 1+ | 400 - Ad |
| Latex B | 10% ASR A | NH₄OH | 17 | 1 | 150 - Ad |

TABLE II-continued

| Latex | ASR | Amine | Crosshatch | Knife Peel | Force-to-Peel |
|---|---|---|---|---|---|
| Latex B | none | A0742 | 0 | 1+ | 250 - Ad |
| Latex B | 10% ASR A | A0742 | 48 | 4 | 1650 - Co/S |

Latex B = Latex with composition equal to 49 BA/49 Styrene/2 MAA, particle size = 297 nm.
ASR A = 80 EA/20 MAA with 1.2% MMP as claim transfer agent, particle size = 156 nm.
A0742 is aminosilane: 3-aminopropylmethyldiethoxy silane.

Example 3

In Example 3 various changes in acid level, molecular weight, and composition of the alkali-soluble resin demonstrate consistent improvements in chalk adhesion. The alkali-soluble resins in this example are designated as ASR A, ASR B, ASR C, ASR D and ASR E. They are each blended with the macromolecular aqueous dispersion, Latex A, at 10 weight percent. ASR B with a composition of 90 EA/10 MAA with 1.2% MMP was prepared according to the procedure for ASR A, except that 720 g of EA and 80 g of MAA were used to prepare the pre-emulsion. The resulting ASR had a solids content of 41.8%, a pH of 2.0, a particle size of 137 nm, a Brookfield viscosity (#1, 60) of 11 cps and a weight average molecular weight of 15,500. ASR C with a composition of 70 EA/30 MAA with 1.2% MMP was prepared according to the procedure for ASR A, except that 560 g of EA and 240 g of MAA Were used to prepare the pre-emulsion. The resulting ASR had a solids content of 42.1%, a pH of 2.1, a particle size of 292 nm, a Brookfield viscosity (#1, 60) of 10 cps and a weight average molecular weight of 17,000. ASR D with a composition of 70 EA/30 MAA with 1.2% MMP is similar to ASR A but with a lower molecular weight and was prepared according to the procedure for ASR A, except that 19.2 g of MMP was used to prepare the pre-emulsion. The resulting ASR had a solids content of 42.2%, a pH of 2.1, a particle size of 195 nm, a Brookfield viscosity (#1, 60) of 12 cps and a weight average molecular weight of 8,500. ASR E with a composition of 33.3 BA/9.5 STY/33.3 MMA/23.9 MAA with 1.1% MMP was prepared according to the procedure for ASR A, except that 280 g BA, 280 g MMA, 80 g STY, 200 g of MAA and 9.6 g of MMP were used to prepare the pre-emulsion. The resulting ASR had a solids content of 42.5%, a pH of 2.4, a particle size of 79 nm and a Brookfield viscosity (#1, 60) of 34 cps.

The blends in this example were formulated into the same paint formulation as Example 1.

TABLE III

| Latex | ASR | Amine | Crosshatch | Knife Peel | Force-to-Peel |
|---|---|---|---|---|---|
| Substrate = Chalky Alkyd | | | | | |
| Latex A | none | NH₄OH | 0 | 4 | 650-Ad/Co |
| Latex A | 10% ASR B | A0742 | 31 | 7 | 1700-Co/Ad |
| Latex A | 10% ASR A | A0742 | 100 | 7 | 1450-Co |
| Latex A | 10% ASR C | A0742 | 100 | 8 | 1400-Co |
| Latex A | 10% ASR D | A0742 | 100 | 8 | 1300-Co/S |
| Latex A | 10% ASR E | A0742 | 100 | 5 | 1700-Co/S |

Latex A = Latex with composition equal to 49 BA/49 MMA/2 MAA, particle size = 291 nm.
ASR A = 80 EA/20 MAA with 1.2% MMP as chain transfer agent, particle size = 156 nm.
ASR B = 90 EA/10 MAA with 1.2% MMP as chain transfer agent, particle size = 137 nm.
ASR C = 70 EA/30 MAA with 1.2% MMP as chain transfer agent, particle size = 292 nm.
ASR D = 80 EA/20 MAA with 2.4% MMP as chain transfer agent, particle size = 195 nm.
ASR E = 33.5 BA/9.5 STY/33.3 MMA/23.9 MAA with 1.1% MMP as chain transfer agent, particle size = 79 nm.
A0742 is aminosilane: 3-aminopropylmethyldiethoxy silane.

Example 4

In this example, the adhesion to chalky substrates is demonstrated with blends of an acid-functional alkali-soluble resin and aminosilane with various macromolecular aqueous dispersions with different compositions. In this example, Latex C has the composition of 79.5 VA/20 BA/0.5 SVS and was prepared by the following procedure: A 5 liter glass reactor equipped with an agitator, a thermocouple for monitoring the temperature and a reflux condenser, was charged with 800 g of deionized water and purged with nitrogen. After heating to 80° C., 4.0 g of ammonium persulfate dissolved in 20 g of deionized water and 165 g of a seed latex (45% solids, 100 nm diameter) were added to the reactor. The temperature was adjusted to 76° C., and then a pre-emulsion prepared from 1590 g vinyl acetate, 400 g butyl acrylate, 40 g of sodium vinylsulfonate (25% ai), 5 g of sodium dodecylbenzenesulfonate, 57.4 g Triton X-405 and 517 g deionized water and an additional 3.0 g of ammonium persulfate dissolved in 90 g deionized water were added to the reactor over a three hour time period while maintaining the temperature at 76° C. When the additions were complete, the temperature was maintained at 76° C. for an additional 30 minutes. The reaction was cooled to 70° C. and 4 g of t-butyl hydroperoxide dissolved in 50 g of deionized water and 3.5 g of sodium formaldehydesulfoxylate dissolved in 50 g of deionized water were added. The pH was adjusted with 2 g of NaOH dissolved in 22 g deionized water. The resulting latex had a solids content of 54.7%, a pH of 5.5, a particle size of 265 nm and a Brookfield viscosity (#1, 60) of 48 cps.

The macromolecular aqueous dispersions in this example are designated as Latex A, Latex B and Latex C. ASR A at 10 weight percent is added to each macromolecular aqueous dispersion and then neutralized with A0742, the aminosilane. These blends were then added to the same paint formulation as in Example 1. This example also demonstrates the performance of the invention over chalky substrates which have varying degrees of severity due to differences in natural weathering conditions (Board #1 versus Board #2).

TABLE IV

| Latex | ASR | Amine | Crosshatch | Knife Peel | Force-to-Peel |
|---|---|---|---|---|---|
| Substrate = Chalky Alkyd, Board #1 | | | | | |
| Latex A | none | NH₄OH | 0 | 1+ | 200 - Ad |
| Latex A | 10% ASR A | A0742 | 0 | 4 | 1350 - Co/S |
| Latex B | none | NH₄OH | 0 | 1+ | 400 - Ad |
| Latex B | 10% ASR A | A0742 | 48 | 4 | 1650 - Co/S |
| Latex C | none | NH₄OH | 0 | 2 | 350 - Ad |
| Latex C | 10% ASR A | A0742 | 43 | 4 | 1250 - Co |
| Substrate = Chalky Alkyd, Board #2 | | | | | |
| Latex A | none | NH₄OH | 5 | 5 | 700 - Ad |
| Latex A | 10% ASR A | A0742 | 100 | 8 | 1450 - Co/S |
| Latex B | none | NH₄OH | 98 | 7 | 1050 - Ad/Co |
| Latex B | 10% ASR A | A0742 | 100 | 9 | 1500 - Co/S |
| Latex C | none | NH₄OH | 100 | 7 | 950 - Co/Ad |
| Latex C | 10% ASR A | A0742 | 100 | 8 | 950 - Co/S |

Latex A = Latex with composition equal to 49 BA/49 MMA/2 MAA, particle size = 291 nm.
Latex B = Latex with composition equal to 49 BA/49 Styrene/2 MAA, particle size = 297 nm.
Latex C = Latex with composition equal to 79.5 VA/20 BA/0.5 SVS, particle size = 265 nm.
ASR A = 80 EA/20 MAA with 1.2% MMP as chain transfer agent, particle size = 156 nm.

Example 5

In Example 5, the alkali-soluble resin, ASR A, is blended with a commercial macromolecular aqueous dispersion at levels from 6 weight percent to 10 weight percent. The resulting blends were then neutralized to varying degrees, 60% to 100%, with the aminosilane A0742. Improvements in adhesion to chalky substrates were realized at various levels of alkali-soluble resin and percent neutralization with aminosilane. The paint formulation in this example is the same as in Example 1.

TABLE V

| Latex | ASR Level | % Neutralization with A0742 | Crosshatch | Knife Peel | Force-to-Peel |
|---|---|---|---|---|---|
| Substrate = Chalky Alkyd | | | | | |
| Latex D | 0% | 0% | 0 | 5 | 100 - Ad |
| Latex D | 6% | 60% | 0 | 3+ | 1050 - Co/Ad |
| Latex D | 6% | 80% | 0 | 4 | 1050 - Co/Ad |
| Latex D | 6% | 100% | 0 | 4 | 1200 - Co/Ad/S |

TABLE V-continued

| Latex | ASR Level | % Neutralization with A0742 | Crosshatch | Knife Peel | Force-to-Peel |
|---|---|---|---|---|---|
| Latex D | 6% | 120% | 2 | 6 | 1700 - Co/S |
| Latex D | 8% | 60% | 0 | 6 | 1450 - Co/Ad |
| Latex D | 8% | 80% | 0 | 6 | 1700 - Co |
| Latex D | 8% | 100% | 4 | 7 | 1700 - Co |
| Latex D | 8% | 120% | 90 | 8 | 1450 - Co/S |
| Latex D | 10% | 60% | 1 | 7+ | 500 - Ad/Co |
| Latex D | 10% | 80% | 13 | 8+ | 1250 - Co/S |
| Latex D | 10% | 100% | 92 | 8+ | 1250 - Co/S |
| Latex D | 10% | 120% | 98 | 8+ | 1350 - Co/S |

Latex D = Rhoplex AC-388, a commercial latex available from Rohm and Haas Company.
ASR = ASR A = 80 EA/20 MAA
Aminosilane used in this case is 3-aminopropylmethyldiethoxy silane.

I claim:

1. A method for improving the adhesion of a coating to chalky substrates comprising combining a macromolecular aqueous dispersion with an acid-functional alkali-soluble polymer to form a blend composition, said polymer having its acid functionality neutralized by an aminosilane and applying the coating of said blend composition to a chalky substrate.

2. An exterior latex paint containing the blend composition of the method of claim 1.

3. A method for improving the adhesion of a coating to a chalky substrate comprising:

combining a macromolecular aqueous dispersion with about 5% to about 20% by weight based on the total weight of said composition of an acid-functional alkali-soluble polymer to form a blend composition, said polymer having its acid functionality neutralized by an aminosilane selected from the group consisting of trimethoxysilylpropyldiethylenetriamine, N-methylaminopropyltrimethoxysilane, N-(2-aminoethyl)-3-aminopropylmethyldimethoxysilane, N-(2-aminoethyl)-3-aminopropyltrimethoxysilane, aminopropylmethyldimethoxysilane, 3-aminopropyltrimethoxysilane, 3-aminopropylmethyldiethoxysilane and 3-aminopropyltriethoxysilane; and applying the coating of said blend composition to said chalky substrate, said coating having improved adhesion to said chalky substrate.

4. A method for improving the adhesion of a coating to a chalky substrate comprising:

combining a macromolecular aqueous dispersion with about 5% to about 20% by weight based on the total weight of said composition of an acid-functional alkali-soluble polymer to form a blend composition, said polymer having its acid functionality neutralized by an aminosilane selected from the group consisting of trimethoxysilylpropyldiethylenetriamine, N-methylaminopropyltrimethoxysilane, N-(2-aminoethyl)-3-aminopropylmethyldimethoxysilane, N-(2-aminoethyl)-3-aminopropyltrimethoxysilane, aminopropylmethyldimethoxysilane, 3-aminopropyltrimethoxysilane, 3-aminopropylmethyldiethoxysilane and 3-aminopropyltriethoxysilane and said polymer being polymerized from monomers selected from the group consisting of olefinically unsaturated compounds, vinyl esters and monovinyl aromatic compounds; and applying the coating of said blend composition on said chalky substrate, said coating having improved adhesion to said chalky substrate.

5. A method for improving the adhesion of a coating to a chalky substrate comprising:

combining a macromolecular aqueous dispersion with about 5% to about 20% by weight based on the total weight of said composition of an acid-functional alkali-soluble polymer having a weight average molecular weight of less than about 100,000 to ensure its solubility to form a blend composition, said polymer having its acid functionality neutralized by an aminosilane selected from the group consisting of trimethoxysilylpropyldiethylenetriamine, N-methylaminopropyltrimethoxysilane, N-(2-aminoethyl)-3-aminopropylmethyldimethoxysilane, N-(2-aminoethyl)-3-aminopropyltrimethoxysilane, aminopropylmethyldimethoxysilane, 3-aminopropyltrimethoxysilane, 3-aminopropylmethyldiethoxysilane and 3-aminopropyltriethoxysilane and being polymerized from monomers selected from the group consisting of olefinically unsaturated compounds, vinyl esters and monovinyl aromatic compounds; and applying the coating of said blend composition on said chalky substrate, said coating having improved adhesion to said chalky substrate.

6. A coating having improved adhesion to a chalky substrate produced in accordance with claim 1, 3, 4 or 5.

* * * * *